Patented May 6, 1924.

1,493,209

UNITED STATES PATENT OFFICE.

WILLIAM G. LINDSAY, OF NEWARK, NEW JERSEY, ASSIGNOR TO THE CELLULOID COMPANY, A CORPORATION OF NEW JERSEY.

PLASTIC COMPOSITION.

No Drawing. Original application filed April 25, 1922, Serial No. 556,530. Divided and this application filed March 13, 1923. Serial No. 624,700.

*To all whom it may concern:*

Be it known that I, WILLIAM G. LINDSAY, a citizen of the United States, residing at Newark, in the county of Essex and State of New Jersey, have invented certain new and useful Improvements in Plastic Compositions, of which the following is a specification.

This invention relates to a process for rendering certain inflammable materials, substance, or compounds, non-inflammable, and to the preparation of commercially useful non-inflammable articles, such as paper, textile fabrics, cellulose plastics, pyroxylin plastics and the like.

The degree of non-inflammability sought for is that which will not permit of a self sustaining combustion, after the application of a flame at ordinary or normal temperature. This degree of non-inflammability will however, be varied according to desired conditions.

I have discovered that inflammable materials which permit of a self sustaining combustion by the application of a flame at ordinary or normal temperature may be prevented from burning under ordinary conditions and rendered non-inflammable provided there is present in suitable combination a heat absorbing compound capable of absorbing or taking up through decomposition, volatilization, or other change, all or the major part of the heat that would be necessary to raise the material or its components to the point at which ignition could be sustained.

This heat absorbing, or endothermic, substance or compound should be of such nature that it will decompose, or otherwise be in condition to absorb heat, before or when the temperature of combustion of the material to be rendered non-inflammable has been reached. The absorption of heat will thus proceed at such a rate as to prevent the combustible material from attaining its temperature of ignition. The endothermic substance or compound will also be selected having in view other characteristics besides its heat absorbing capacity on decomposition in that it may be desired to impart other properties to the resultant product. The relative proportions of the combustible substance, i. e., the substance to be rendered non-inflammable, and endothermic or heat absorbing substance, will be varied somewhat to meet conditions of strength, plasticity, transparency, or other desirable characteristics, but in general will be dependent upon the amount of decomposition, in heat unit equivalents, that can take place at or below the temperature at which combustion could be sustained by the exothermic compound if the heat of combustion were not absorbed at a greater rate than that at which it could be liberated. The general rule is that a sufficient quantity of endothermic substance should be employed to absorb upon its decomposition at a temperature below the ignition point of the exothermic substance, a sufficient amount of heat to prevent a sustained combustion of the said exothermic substance.

In carrying out my invention, any one of a number of products may be the aim. The characteristics of these products may vary from that of a hard, nonmoldable, dense solid sheet material which may be used for cutting out various objects such as brush backs, mirror backs, knife handles, etc., to that of a thin, highly flexible product which may be used for the coating of fabrics, paper and the like or which can be used in place of various textiles and other flexible materials. The flexible compound may also be used as a substitute for leather. It may also possess the necessary characteristics required in compounds that are to be molded such as molded boxes, molded handles, molded brushes, mirrors, etc.

In carrying out the invention the procedure will vary according to the nature and physical properties of the material treated. The exothermic substances which I propose to use will be nitrocellulose, acetylcellulose, or some cellulosic ester, ether, derivative, or compound.

The permanent or non-volatile solvents generally referred to as the plasticizing agents and which are to be combined with the pyroxylin or other cellulose derivative for the purpose of bringing about the necessary conversion, etc. in the course of manufacture, should be of such nature that the point of ignition is relatively high. In my experiments I have found that the organic phosphates possess the necessary characteristics of solubility and at the same time possess the requisite temperature of ignition.

The most satisfactory results are produced with the aromatic phosphates because of their relatively high stability and resistance to decomposition, and because they possess at the same time the necessary solvent or plasticizing effect on the nitrocellulose, as well as a relatively high ignition point.

To a mixture of nitrocellulose and an aromatic phosphate, as for example, liquid tricresylphosphate, I add a sufficient amount of calcium sulphate to prevent the combined mixture from sustaining ignition upon the application and withdrawal of a flame. An example of proportions for this purpose is 100 parts of acetylcellulose, 30 parts of liquid tricresylphosphate and 50 parts of calcium sulphate, ($CaSO_4 2H_2O$). Material of this composition, when manufactured according to the usual methods as obtained in the pyroxylin plastic industry, will possess hardness, toughness and moldability in similar degree to the usual varieties of "celluloid", manufactured in the form of ivory, opaque colors and the like.

In the manufacture of these non-inflammable compounds I proceed substantially as in the manufacture of ordinary pyroxylin plastic materials incorporating the calcium sulphate compound with the soaked or colloidized mass of pyroxylin and liquid tricresylphosphate prior to final mastication on the rolls. This incorporation may be effected in kneaders or the calcium sulphate compound may be directly added during the course of mastication on the rolls. The calcium sulphate compound may also be incorporated with the pyroxylin or cellulose acetate in the same operation in which the liquid tricresylphosphate is incorporated, the method for which is described in my U. S. Patent No. 1,233,374, granted July 17, 1917.

In the choice of liquid volatile solvent, I may select any one or a combination of a number of the common ordinary solvents, such as methyl alcohol, ethyl alcohol, acetic ether, acetone, amyl acetate, or the various commercial grades and mixtures of these compounds as are ordinarily found upon the market.

In the manufacture of the flexible non-inflammable compound having the properties of leather and the like, I proceed as in the example specified except that I use a somewhat greater proportion of liquid tricresylphosphate. Material of this composition may be worked up according to the usual method for the manufacture of pyroxylin plastic compounds and produced in the form of sheets by shaving from a block, or it may be dissolved in a suitable proportion of solvent such as wood alcohol, acetone, and the like and spread upon a suitable surface such as a textile fabric, leather and the like.

This application is a division of my application Ser. No. 556,530, filed April 25, 1922.

I claim:

1. A thermo plastic composition comprising acetyl cellulose plasticized by an aromatic phosphate in a mixture with sufficient calcium sulphate to produce a fire retarding effect.

2. A thermo plastic composition comprising acetyl cellulose plasticized by tricresylphosphate in admixture with sufficient calcium sulphate to produce a fire retarding effect.

3. A tough non-inflammable acetyl cellulose composition containing calcium sulphate in access of twenty per cent of the composition.

4. A composition having substantially the physical properties of the usual pyroxylin plastics, said composition having as a base acetyl cellulose plasticized by an aromatic phosphate and as a fire retarding ingredient a heat absorbing salt of calcium.

5. A composition having substantially the physical properties of the usual pyroxylin plastics, said composition having as a base plasticized acetyl cellulose and as a fire retarding ingredient calcium sulphate.

WILLIAM G. LINDSAY.